US005388622A

United States Patent [19]
Phillips

[11] Patent Number: 5,388,622
[45] Date of Patent: Feb. 14, 1995

[54] AUTOMATIC SHUTOFF VALVE

[75] Inventor: Paul E. Phillips, White Hall, Mich.

[73] Assignee: EBW, Inc., Muskegon, Mich.

[21] Appl. No.: 147,068

[22] Filed: Nov. 3, 1993

[51] Int. Cl.6 ............................................. F16K 21/00
[52] U.S. Cl. ................................... 141/198; 141/128;
141/229; 141/220; 141/212; 141/216; 137/409;
137/423; 137/630; 137/630.15
[58] Field of Search ................. 141/128, 205, 211–213,
141/216, 229, 220–222, 198–202; 137/409, 423,
427, 429, 448, 630, 630.15

[56] References Cited

U.S. PATENT DOCUMENTS

| | | |
|---|---|---|
| 320,716 | 6/1885 | Stadler . |
| 500,453 | 6/1893 | Wright . |
| 979,819 | 12/1910 | Anderson . |
| 1,219,222 | 3/1917 | Baxter et al. . |
| 1,246,033 | 11/1917 | Adams . |
| 1,262,443 | 4/1918 | Cahill . |
| 1,268,947 | 6/1918 | Fell . |
| 1,289,490 | 12/1918 | Lundstrom . |
| 1,312,531 | 8/1919 | Garbisch . |
| 1,313,386 | 8/1919 | Jones . |
| 1,360,869 | 11/1920 | Béliveau . |
| 1,462,253 | 6/1923 | Tobiasson . |

(List continued on next page.)

FOREIGN PATENT DOCUMENTS

| | | |
|---|---|---|
| 0312320 | 4/1989 | European Pat. Off. . |
| 620649 | 6/1929 | France . |
| 1360869 | 4/1964 | France . |
| 2304014 | 10/1976 | France . |
| 2331732 | 6/1977 | France . |
| 2355736 | 1/1978 | France . |
| 1122450 | 7/1962 | Germany . |
| 1500147 | 3/1969 | Germany . |
| 2104071 | 8/1971 | Germany . |
| 8100326 | 8/1982 | Netherlands . |
| 1444260 | 7/1976 | United Kingdom . |
| 1531083 | 11/1978 | United Kingdom . |
| 8911446 | 11/1989 | WIPO . |

OTHER PUBLICATIONS

OPW Advertisement for OPW 61-SO Series, "Overfill Prevention Valve", Apr. 1989.
OPW Advertisement for OPW1 Spill Container & OPW 61-SO Overfill Prevention Valve System, Oct., 1988.
OPW Technical Bulletin for "61-SO Overfill Prevention Valve", May, 1988.
OPW Catalog, "Service Station Equipment", Apr., 1988.
OPW Instruction Pamphlet for "Assembly & Installation for OPW 61-SO Overfill Prevention Valve", Feb., 1988.

Primary Examiner—J. Casimer Jacyna
Attorney, Agent, or Firm—Basile and Hanlon

[57] ABSTRACT

A two-stage float actuated shut-off valve for use in underground fuel storage tanks utilizes a drop tube coaxially mounted within the storage tank fill pipe. Fuel flowing into the tank is passed through the drop tube which projects downwardly into the interior of the tank to a valve housing located at the lower end of the drop tube. Floats slidably mounted in a recessed area in the housing outside of the drop tube within the tank independently operate pivoted valve doors to a closed position within the valve housing, a lower float closing one valve door to block a major portion of incoming fuel flow passage when the level of fuel in the storage tank reaches a predetermined first level and a second upper float causing the secondary valve door to overlap an aperture in the main valve door to almost completely close the flow of fuel to the tank.

19 Claims, 4 Drawing Sheets

U.S. PATENT DOCUMENTS

| | | | |
|---|---|---|---|
| 1,463,129 | 7/1923 | Milton et al. | |
| 1,514,630 | 11/1924 | Richardson. | |
| 1,689,066 | 10/1928 | Baxter. | |
| 1,859,009 | 5/1932 | Stetson. | |
| 1,892,455 | 12/1932 | Ayers | 137/423 |
| 1,978,314 | 10/1934 | Lancaster. | |
| 2,199,085 | 4/1940 | Smith | 137/139 |
| 2,299,360 | 10/1942 | Tharp | 137/104 |
| 2,340,936 | 2/1944 | Cook | 220/86 |
| 2,499,409 | 3/1950 | Norway | 62/1 |
| 2,569,110 | 9/1951 | McGillis et al. | 137/68 |
| 2,578,926 | 12/1951 | Douglas | 226/127 |
| 2,685,891 | 8/1954 | Segelhorst et al. | 137/614.16 |
| 2,705,372 | 4/1955 | Cornell | 33/126.7 |
| 2,773,706 | 12/1956 | Leavell | 284/19 |
| 2,811,179 | 10/1957 | Greenwood | 141/95 |
| 2,918,931 | 12/1959 | Siri | 137/211 |
| 2,918,932 | 12/1959 | Few | 137/211 |
| 3,078,867 | 2/1963 | McGillis | 137/416 |
| 3,189,039 | 6/1965 | Bauer | 137/434 |
| 3,347,263 | 10/1967 | Thompson | 137/448 |
| 3,438,316 | 4/1969 | Rodier | 251/212 |
| 3,495,635 | 2/1970 | Youinou | 141/392 |
| 3,563,263 | 2/1971 | Benson | 137/202 |
| 3,610,273 | 10/1971 | Russell | 137/513.3 |
| 3,661,175 | 5/1972 | Tillman | 137/517 |
| 3,732,902 | 5/1973 | Muller | 141/198 |
| 3,787,022 | 1/1974 | Wilcox | 251/212 |
| 3,791,407 | 2/1974 | Nicholls | 137/512.15 |
| 3,794,077 | 2/1974 | Fanshier | 137/513.3 |
| 3,799,502 | 3/1974 | Baum | 251/124 |
| 3,895,402 | 7/1975 | Page | 4/172.17 |
| 3,963,041 | 6/1976 | McGillis | 137/410 |
| 4,098,307 | 7/1978 | Taylor | 141/220 |
| 4,175,296 | 11/1979 | Goldman | 4/325 |
| 4,266,582 | 5/1981 | Sergent | 141/198 |
| 4,396,034 | 8/1983 | Cherniak | 137/514 |
| 4,407,325 | 10/1983 | Cherniak | 137/514 |
| 4,469,116 | 9/1984 | Hansen | 137/39 |
| 4,573,495 | 3/1986 | Rothe et al. | 137/414 |
| 4,630,655 | 12/1986 | Fleischer et al. | 141/198 |
| 4,667,711 | 5/1987 | Draft | 141/198 |
| 4,703,874 | 11/1987 | Tapperman et al. | 222/198 |
| 4,721,283 | 1/1988 | Wilson | 251/63.4 |
| 4,770,317 | 9/1988 | Podgers et al. . | |
| 4,793,387 | 12/1988 | LeBlanc et al. | 141/86 |
| 4,986,320 | 1/1991 | Kesterman et al. | 141/198 |
| 4,998,571 | 3/1991 | Blue et al. | 141/198 |
| 5,010,915 | 4/1991 | Johnson et al. | 137/423 |
| 5,027,870 | 7/1991 | Butterfield | 141/198 |
| 5,033,519 | 7/1991 | Puffer et al. | 141/198 |
| 5,095,937 | 3/1992 | LeBlanc et al. | 137/423 |
| 5,141,019 | 8/1992 | LeBlanc et al. | 137/423 |
| 5,174,345 | 12/1992 | Kesterman et al. | 141/198 |

AUTOMATIC SHUTOFF VALVE

FIELD OF THE INVENTION

The present invention is directed to a float actuating shutoff valve for terminating the flow of fluid into an underground storage tank to prevent overfilling of the tank.

BACKGROUND OF THE INVENTION

The present invention is directed to a float actuated shutoff valve for terminating the flow of fluid into a storage tank to prevent overfilling of the tank. The valve disclosed, while useful in other applications is particularly well adapted for controlling the filling of underground fuel storage tanks such as are employed in service stations. Underground fuel storage tanks utilized by service stations are filled via a fill pipe which extends upwardly from the top of the tank to a supply coupling located in a relatively shallow manhole in the service station apron. A supply hose from a tank truck is coupled to the supply coupling at the upper end of the fill pipe and upon opening of a shutoff valve on the supply truck, fuel flows by gravity from the truck through the supply hose and fill pipe into the underground storage tank. Typically, neither the tank truck nor the underground storage tank are metered to provide a running indication of how much fuel had been dispensed into the tank during the filling operation. In theory, the delivery man is required to determine how much fuel is in the tank by inserting a dipstick into the tank through the fill pipe before coupling the supply hose to the fill pipe, and is prohibited from coupling the fill pipe to a storage compartment in his truck tank, which contains more fuel than the underground tank has room for. In practice, this last prohibition is almost generally ignored and in the past it was not an unknown practice to continue filling the underground tank until fuel started flowing out of the underground tank vent.

To prevent overfilling, many present day underground storage tanks are provided with a float actuated shutoff valve which closes when the level of fuel within the underground tank rises to a preselected level, for example when the tank is 95% full. Closure of these valves stops the incoming flow of fuel, but traps a substantial quantity, typically 25-30 gallons of fuel, in the supply hose between the float actuated shutoff valve at the fill pipe inlet in the shutoff valve on the tank truck.

The basic problem with float actuated shutoff valves is that while they prevent the filling of the underground storage tank beyond its capacity, they do not solve the main problem created by overfilling, namely, the trapping of 25 or 30 gallons of fuel in the supply hose between the fill pipe and the shutoff valve on the tank truck. The present invention is directed to a solution to the aforementioned concerns.

SUMMARY OF THE INVENTION

A two stage shutoff valve, according to the present invention, includes a cylindrical valve housing mounted at the lower end, a relatively long drop tube suspended at the upper end of the fill pipe and extending downwardly through the fill pipe into the underground tank to a location substantially below the top of the tank. Within the valve housing, a flow passage extends downwardly through an upwardly facing annular valve rim with a main door pivotally mounted on the rim. A secondary door is mounted for pivotal movement overlapping an aperture in the main door.

Actuating rods pass vertically upwardly along the outer side of the drop tube. The actuating rods coupled to first and second pivotal hooks for engagement to the main and secondary doors are respectively coupled at their upper ends to lower and upper floats slottably received on the exterior of the drop tube. The geometry of the actuating rod link and pivotal hook for each door is such that when the actuating rod is at a lower end limit of movement, its associated valve door is in a valve open position in which the door extends substantially, vertically upwardly from its horizontal pivot axis to be located beneath a partial shield attached to the housing which shields the door from downward flow of fuel.

In accordance with the present invention, compression springs coiled about a hinge pin are engaged to resiliently bias the main door to its valve open position. A secondary spring coiled about the hinge pin resiliently biases the secondary valve door toward the position of the main valve door. The strength of the spring associated with the main valve door is selected to be sufficient to open the main valve door against a static head represented by the difference in elevation between the level of fuel in the tank and the level of fuel in the fill pipe.

Other objects and features of the invention will become apparent by reference of the following specification and to the drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
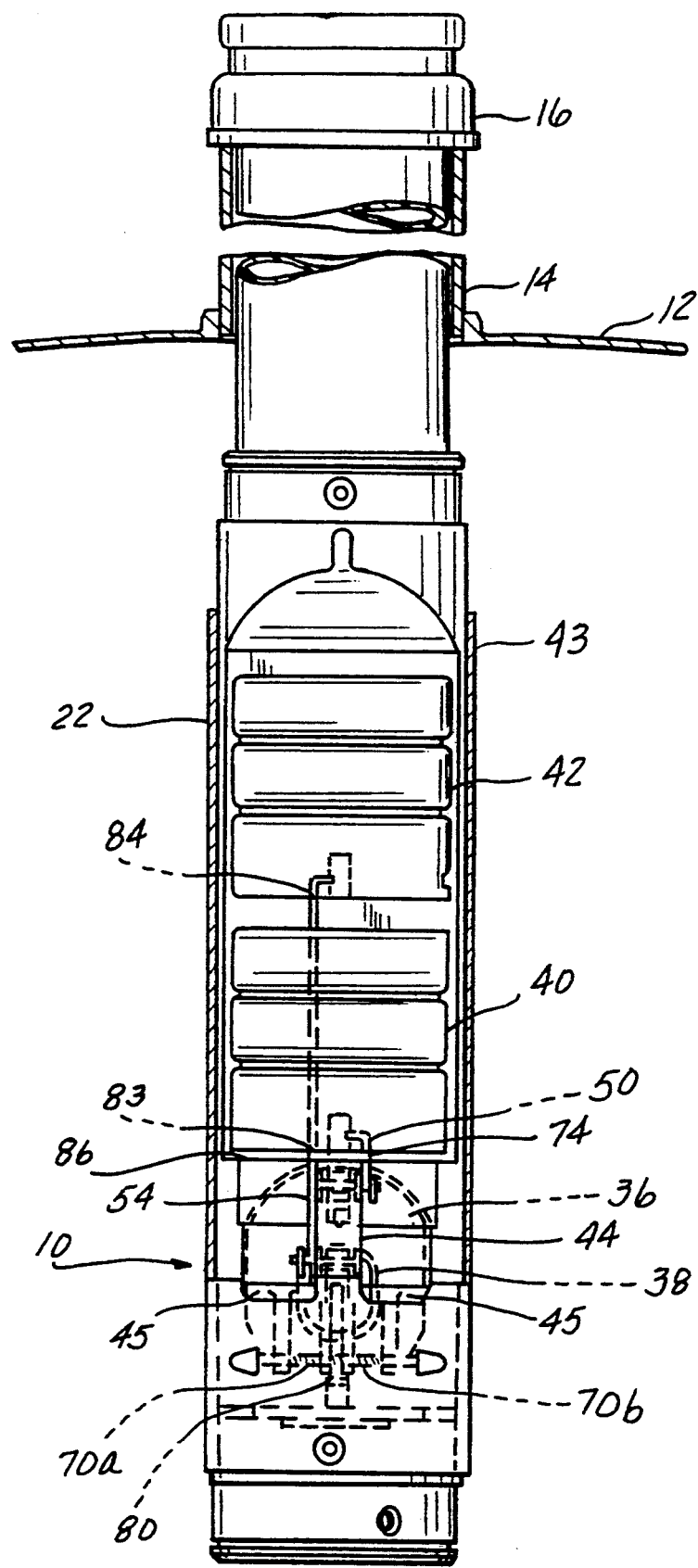
FIG. 1 is an overall side elevational view of a valve assembly embodying the present invention.
Figure 2:
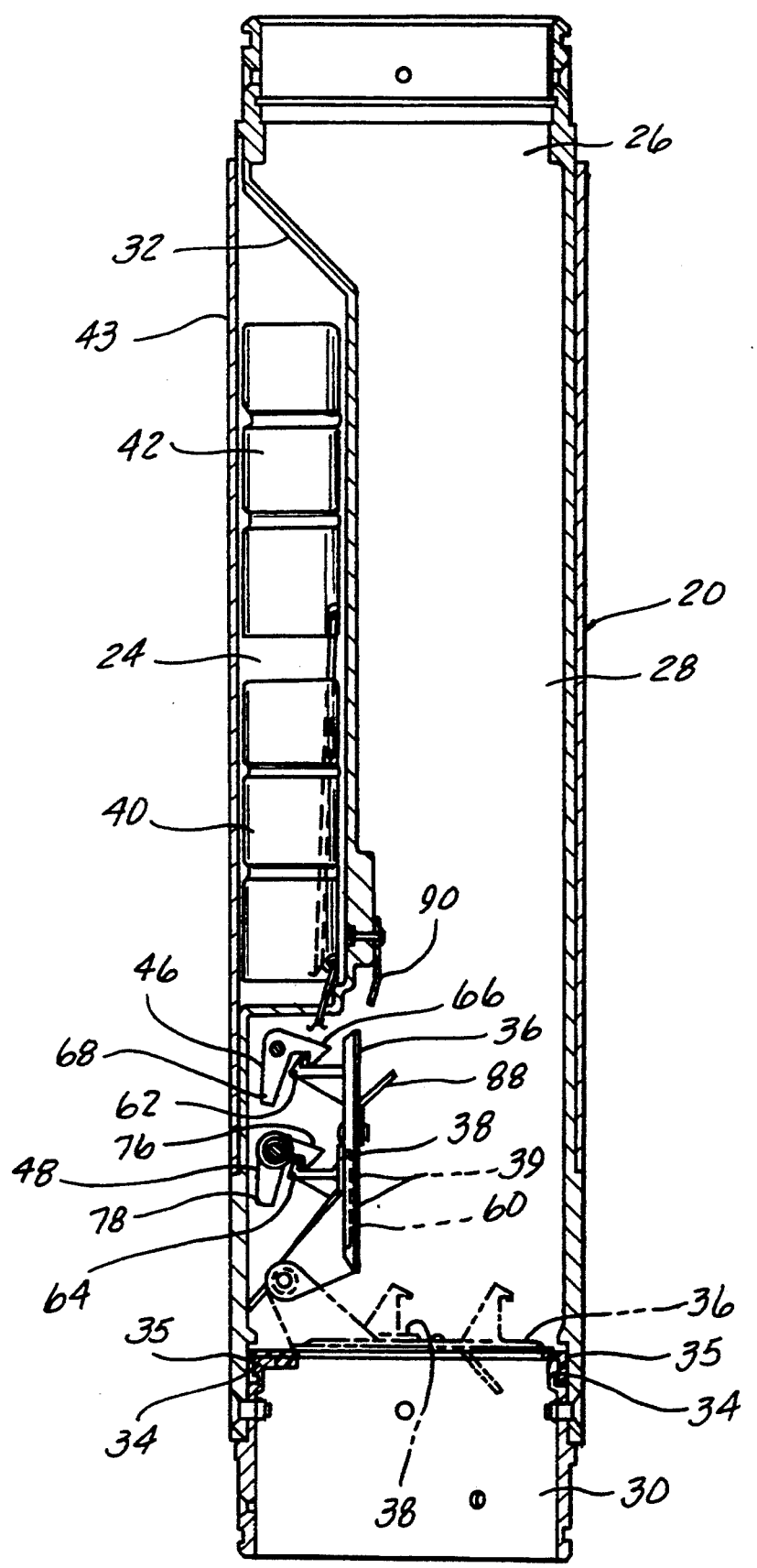
FIG. 2 is a side elevational view showing further details of the valve assembly.
Figure 3:
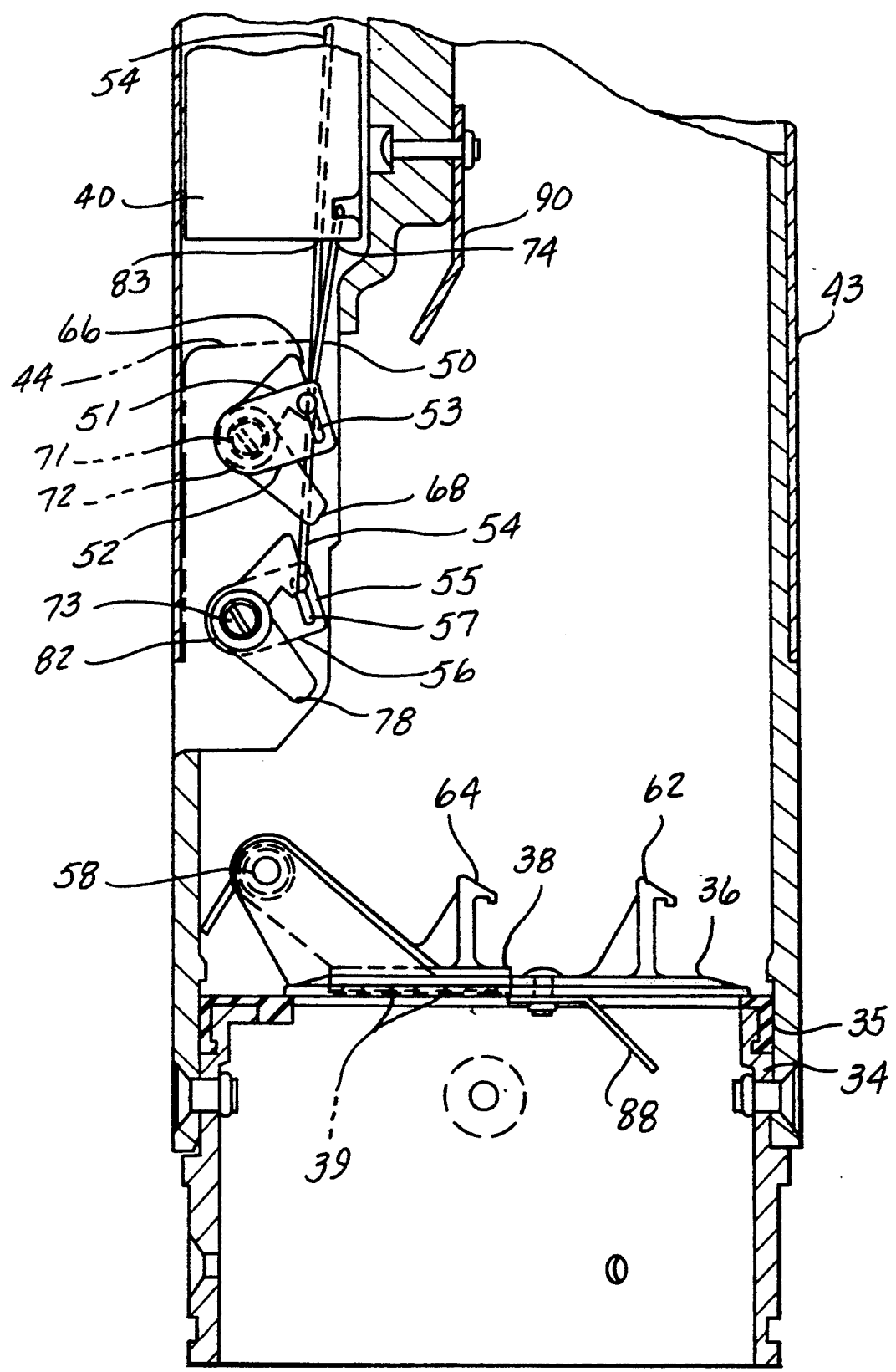
FIG. 3 is a detailed elevational view of the valve housing portion of FIG. 2 showing lever mechanisms which operate valve doors.

Referring to FIGS. 1-3, a valve 10 embodying the present invention is shown that controls the filling of an underground gas filling storage tank 12 from a conventional gasoline delivery truck (not shown). The underground storage tank 12 is provided with a fill pipe 14 which extends upwardly from the tank 12 to an upper end which is located within a relatively shallow manhole in the service station apron. A coupling member 16 is employed to couple the upper end of the fill pipe 14 to one end of the delivery hose from the delivery truck. When the valve 10 is open, fuel flows by gravity from the delivery truck through the pipe valve outlet hose and coupling 16 to the top of fill pipe 14.

In the present case, the hydraulic connections between coupling 16 and fill pipe 14 are such that all fuel flowing into coupling 16 from delivery hoses pass into the interior of an elongated drop tube 20 which projects freely downwardly to fill pipe 14 well into the interior of the underground tank 12. The housing 22 is generally cylindrical having on one side a recessed area 24, in the general midsection of the housing 22. Correspondingly, this provides the drop tube 20 having a first enlarged diameter passage 26, a reduced diameter passage 28, and a second enlarged diameter passage 30. The reduced diameter passage 28 merges with the first enlarged diameter passage 26 at its upper end via an angular shoulder 32. The reduced diameter passage 28 merges with the second enlarged diameter passage 30 via a horizontal upwardly facing shoulder defining the valve seat rim 34. Main and secondary valve doors 36, 38 respectively are mounted within the housing 22 in a manner to be described in greater detail below. Lower and upper hollow floats 40, 42 respectively are slidably received upon the exterior of the drop tube 20 in the recessed area 24 of the housing 22. The floats 40, 42 are confined in the recessed area of the housing by a metal cylindrical cover 43 that encircles most of the housing 22. Pockets 45 at the lowermost end of the cylindrical cover 43 allow fuel to reach the floats 40, 42. A small rectangular housing 44 (as best seen in FIG. 1 and in phantom in FIG. 3) is situated at the lower end of the recessed area 24 of the housing 22. The small rectangular housing 44 contains pivotal hooks 46, 48 which communicate with the reduced diameter passage 28. A first actuating rod 50 attached to the lower float 40 is coupled by a lever mechanism 52 to the first pivotal hook 46. A second actuating rod 54 attached to the upper float 42 is coupled by a second lever mechanism 56 to the second pivotal hook 48.

As shown clearly in FIG. 3, lever mechanism 52 comprises a slotted lever 51 rotatably attached to first pivotal hook 46 by pin 71. The lower end of the first actuating rod 50 slidably travels within slot 53 as the lower float 40 raises and lowers. When rod 50 reaches the uppermost end of slot 53 as the float 40 raises, lever 51 and pin 71 rotate, thereby rotating first pivotal hook 46. When float 40 later lowers as the level of fuel in tank 12 lowers, first actuating rod 50 drops to the lowermost end of slot 53 allowing the first pivotal hook 46 to reset.

Similarly, lever mechanism 56 comprises a slotted lever 55 rotatably attached to second pivotal hook 48 by pin 73. The lower end of the secondary actuating rod 54 slidably travels within slot 57 as the upper float 42 raises and lowers. When rod 54 reaches the uppermost end of slot 57 as the float 42 raises, lever 55 and pin 73 rotate, thereby rotating second pivotal hook 48. When float 42 later lowers as the level of fuel in tank 12 lowers, secondary actuating rod 54 drops to the lowermost end of slot 57 allowing the second pivotal hook 48 to reset.

The main valve door 36 is mounted within lower housing for pivotal movement above a horizontal axis established by a pivot pin 58 received at its opposite ends in bosses upwardly from a valve seat rim 34. The main valve door 36 entirely overlies the valve seat rim 34 when it is in the closed position. A gasket 35 encircles the rim 34 providing a radial and lateral seal at the valve seat rim 34.

The main valve door 36 has an aperture 60 off-centered within the interior of the door 36. The aperture 60 is sized so that when the main valve door 36 is in the closed position, approximately 85–90% of the fluid flow is restricted, allowing for 10–15% flow through the aperture 60.

The secondary valve door 38 similarly is pivotally mounted in the lower housing in the second enlarged diameter passage 30 for rotation about the same horizontal axis as the main valve door 36. When in its closed position, the secondary valve door 38 overlaps the aperture 60 of the main valve door 36 so that when both valve doors 36, 38 are in the closed position, the entire enlarged diameter passage is essentially obstructed by the two doors whose lower surface are in sealed face-to-face engagement with the gasket 35 on the facing valve seat rim 34. As explained further, to provide a slow drain, ribs 39 can be set around the aperture 60 so that when the secondary valve door 38 is in the closed position, it cannot seal the aperture 60.

Approximate to the edge of the main valve door 36 remote from its pivotal mounting, is a main C-latch 62 fixedly secured to the main valve door 36 and is so located that the valve door 36 when in its open position engages with the first pivotal hook 46 of the first actuating rod 50. Correspondingly, approximate to the edge of the secondary valve door 38 remote from its pivotal mounting is a second C-latch 64 fixedly secured to the secondary valve door 38 and is so located that the secondary valve door 38 when in its open position engages with the second pivotal hook 48 of the second actuating rod 54.

The first pivotal hook 46 has a hooked end 66 for engagement with the main C-latch 62 on the main valve door 36 at one end, and an extended leg 68 at the other end. The pivotal hook 46 pivots about the pin 71. The pin 71 is received in bosses 72 about which attached is the first slotted lever 51. Slotted lever 51 in turn communicates with the lower end of the first actuating rod 50. The first actuating rod 50 extends through a bore 74 of the lower float 40 wherein it is attached.

Similarly, the second pivotal hook 48 has a hooked end 76 for engagement with the secondary C-latch 64 on the secondary valve door 38 at one end, and an extended leg 78 at the other end. The second pivotal hook 48 pivots about a pin 73. The pin 73 is received in bosses 82 and connected to the second slotted lever 55. Slotted lever 55 in turn communicates with the lower end of the second actuating rod 54. The second actuating rod 54 extends through bores 83, 84 of the lower float 40 and the upper float 42 respectively to be fixedly attached to the upper float 42.

The main valve door 36 is spring-loaded by springs 70a and 70b so that it is biased in the open position. The secondary valve door 38 is spring-loaded by spring 80 whereby it is biased toward the location of the main valve door 36.

In the preferred embodiment, the main valve door 36 has a fin 88 projecting at an angle from the underside of the main valve door 36, so that when the main valve door 36 is in the open position, the fin 88 partially extends into the flow path. The fin 88 also provides more surface area, so that when the main valve door is not secured by pivotal hook 46, the fin 88 ensures movement to the closed position from the force of the fuel flow. Additionally, a partial shield 90 is attached in the drop tube 20 near the lower end of recessed area 24 of the housing to protect the fin 88 and to direct the force of the fuel to operate the valve mechanism.

In FIG. 2, main valve door 36 is shown in its open position in solid line, (closed position in phantom). When the main valve door 36 is open it is assumed that the level of liquid in the tank 12 is below lower float 40 and the float 40 is thus at its lowermost position relative to the valve housing 22. At this time, the lower side of the float 40 rests upon a shelf 86 formed by the outside housing.

When the valve doors 36, 38 are in the open position the C-latches 62, 64 on each respective door is held in place by their respective pivotal hook 46, 48. Although the main valve door 36 is biased to its open position, the force of the fuel through the passage overcomes the bias of the springs 70a and 70b to pivot the valve door 36 to the closed position. Thereby, the engagement of the pivotal hook 46 to the C-latch 62 secures the main valve door 36 in the open position until the predetermined level of fluid in the tank 12 is attained as indicated by the rise of the lower float 40. This prevents an inadvertent closure of the valve door 36.

Figure 4:
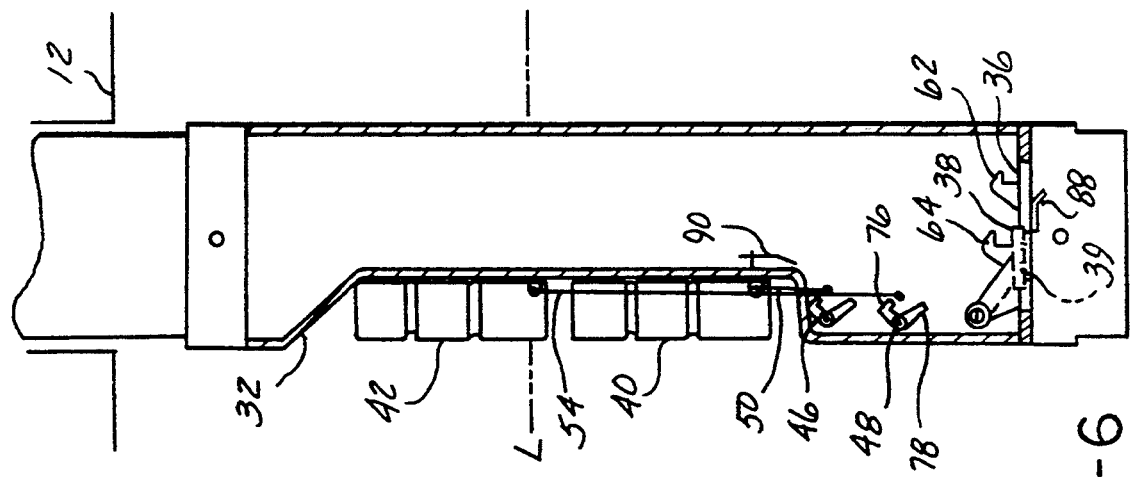
FIGS. 4, 5 and 6 are schematic diagrams showing successive steps of the valve.
Figure 5:
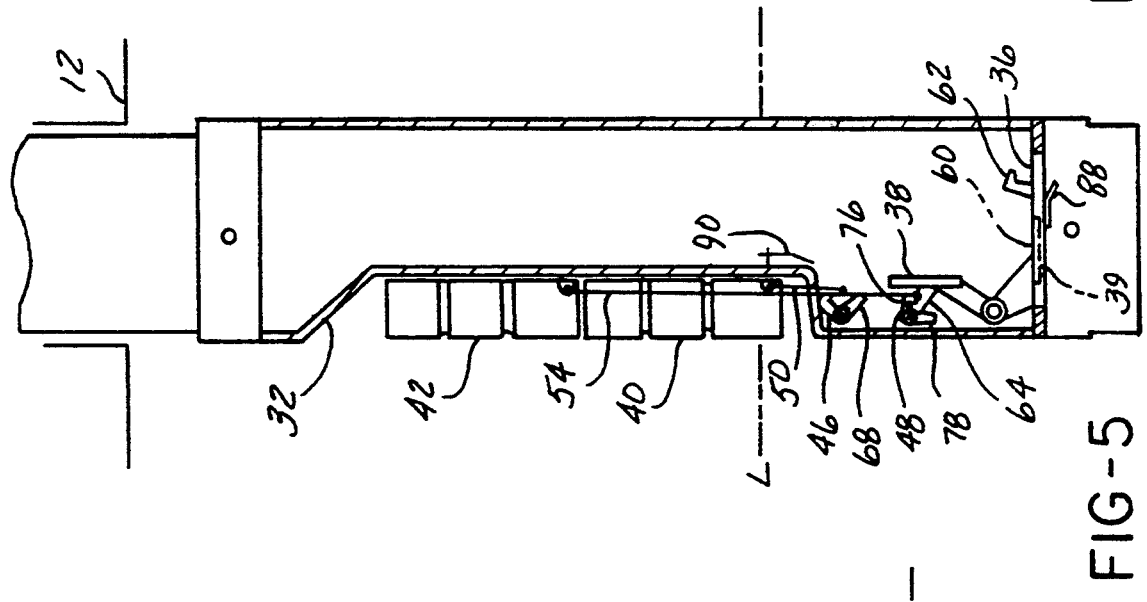
Figure 6:
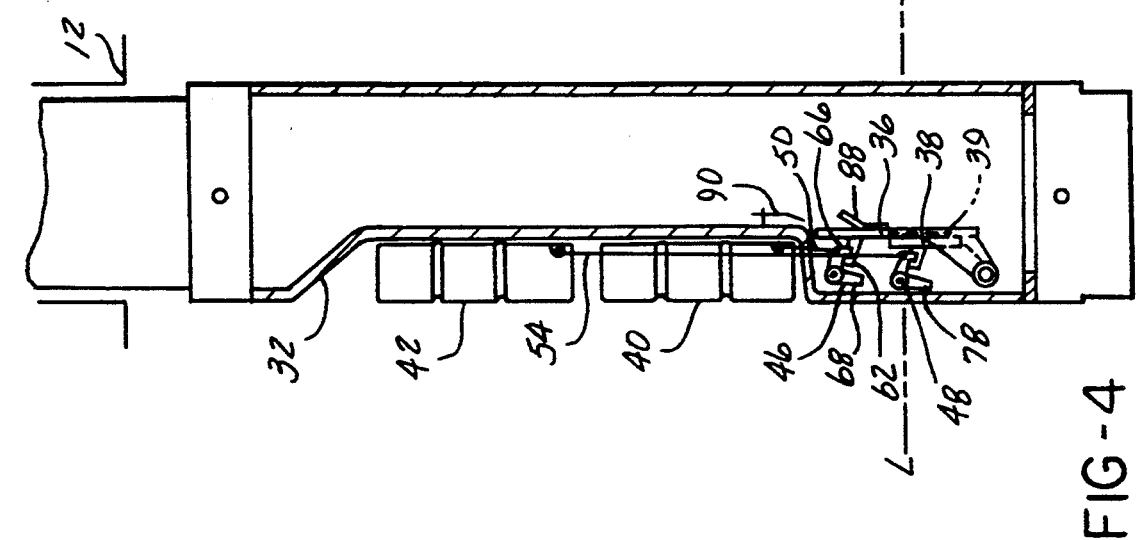

Referring to FIGS. 4-6, as the level L of liquid in the tank 12 rises, float 40 will eventually be void of the liquid and start to rise. The travel distance of the lower float 40 is limited by the length of actuating rod 50 and the position of upper float 42. As float 40 rises from the position shown in FIG. 4 to that shown in FIG. 5, the upwardly moving float 40 actuates the lever mechanism 52 to pivot the first pivotal hook 46 and lift the hook end 66 away from the main C-latch 62. As the pivotal hook 46 pivots about the pin 71, the hook end 66 releases the valve door 36, and the extended leg 68 moves toward the C-latch 62 on the valve door 36 where it may optionally impel the valve door 36 in the stream of the flow passage. The fin 88 is pulled out by fluid flow beyond the protection of the partial shield 90 and into the main path of the flow. The force of the fluid against the fin 88 and door 36 overcomes the bias of the springs 70a and 70b to keep the door 36 in the open position. Thereby, the main valve door 36 closes and restricts the flow of fuel by approximately 85-90%. At a reduced flow rate of 30-40 gallons per minute, the restricted inlet flow rate after closure of the valve door 36, the delivery man has several minutes to shut off the flow of incoming fuel while leaving ample capacity within the tank 12 to drain the supply hose through the restricted aperture 60.

If for some reason, the delivery man does not shut off the incoming flow in time and the level of fuel within the tank rises to a level at which upper float 42 is elevated to actuate secondary valve door 38 to its closed position, closure of both main valve door 36 and secondary valve door 38, almost completely blocks the flow of fuel into the upper end of drop tube 20, and temporarily traps fuel in the line between the closed valve doors 36, 38 and the shut-off valve in the tank truck.

The upper float 42 and the secondary valve door 38 act similar to the lower float 40 and main valve door 36. As the level L of liquid in the tank rises, the upper float 42 will eventually be void of liquid and start to rise. The travel distance of the upper float 42 is limited by the length of the actuating rod 54 and the angular shoulder 32. As the upper float 42 rises from the position shown in FIG. 5 to that shown in FIG. 6, the upwardly moving float 44 actuates the lever mechanism 56 to pivot the secondary pivotal hook 48 and lift the hook end 76 of the pivotal hook 48 away from the C-latch 64 of the secondary valve door 38. As the pivotal hook 48 pivots about the pin 73, the extended leg 78 moves toward the C-latch 64 on the secondary valve door 38. Since the spring 80 biases the secondary valve door 38 toward the main valve door 36, and the C-latch 64 is no longer restrained by the secondary pivotal hook 48; the secondary valve door 38 closes to overlay the ribs 39 surrounding the aperture 60 in the main valve door 36. When both doors are closed, approximately 99% of the flow of fuel is restricted, because the ribs 39 prevent the secondary door from fully sealing the aperture 60. This allows any residual fuel in the pipe line to slowly drain into the tank.

When the fuel is turned off and there is no longer fuel entering the passage of the down tube the spring 70 of the main valve door 36 will again bias the door 36 to the open position. Since the secondary valve door 38 is biased toward the main valve door 36, the secondary valve door 38 will also return to the open position along with the main valve door 36.

When the level of liquid L within the tank 12 starts to drop below that indicated in FIG. 6, upper float 42 will start moving downwardly. The secondary pivotal hook 48 will pivot to its original position as it is being lowered by the actuating rod 54 of the upper float 42. As the secondary pivotal hook 48 pivots to its original position, it will come into contact and secure the C-latch 64 of the secondary valve door 38 which has previously been positioned in the open position.

The locking arrangement described in detail above employed in conjunction with valve door 38 is duplicated with a similar locking mechanism employed in conjunction with the main valve door 36. As the level of liquid L continues to drop below that level indicated in FIG. 5, lower float 40 will start moving downwardly. As that float 40 moves, the actuating rod 50 forces down on the pin 58 to pivot the first pivotal hook 46. The first pivotal hook 46 will come into contact with the C-latch 62 of the main valve door 36 and secure it in the open position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An overfill valve assembly for preventing overfilling of a liquid storage tank via an inlet opening in the top of said tank;
   said valve assembly comprising a valve housing essentially cylindrical, having at one side a recessed area;
   a hollow drop tube sealingly secured to valve housing and extending vertically therethrough to the storage tank;
   said drop tube having a first enlarged diameter section, a reduced diameter section, and a second enlarged diameter section, wherein the reduced diameter merges with the first enlarged diameter section at its upper end via an angular shoulder and merges with the second enlarged diameter section via a horizontal upwardly facing shoulder, said reduced diameter section corresponding to the recessed area of the housing;
   a flow passage through the drop tube;
   a first valve means in said housing having a valve door movable between a valve door open position and a valve door closed position wherein said first valve door projects into said flow passage to substantially restrict downward flow through said passage;
   a second valve means in said housing having a valve door movable between a valve door open position and a valve door closed position wherein said second valve door projects into said flow passage and is cooperable with said first valve door when both of said first and second valve doors are in the respective closed positions to block almost all downward flow through said passage;

a first hollow float slidably received upon the exterior of said drop tube in the recessed area of the housing;

a second hollow float slidably received upon the exterior of said drop tube above the first float in the recessed area of the housing;

a first actuating rod coupling said first float to said first valve means to locate said first valve door in its valve door open position when said first float is at a lower end limit of movement on said tube and to shift said first valve door toward its closed position in response to upward movement of said first float; and a second actuating rod coupling said second valve means to said second float to locate said second valve door in its valve door open position when said second float is at a lower end limit of movement relative to said tube and to shift said second valve door toward its closed position in response to upward movement to said second float.

2. An overfill valve assembly for preventing overfilling of liquid storage tank via an inlet opening in the top of said tank and shutting off the flow of fluid;

said valve assembly comprising a valve housing essentially cylindrical, having at one side a recessed area;

a hollow drop tube sealingly secured to valve housing and extending vertically therethrough to the storage tank;

said drop tube having a first enlarged diameter section, a reduced diameter section, and a second enlarged diameter section, wherein the reduced diameter merges with the first enlarged diameter section at its upper end via an angular shoulder and merges with the second enlarged diameter section via a horizontal upwardly facing shoulder, said upwardly facing shoulder forming a rim, said reduced diameter section corresponding to the recessed area of the housing;

a flow passage through the drop tube;

a first hollow float slidably received upon the exterior of said drop tube in the recessed area of the housing;

a second hollow float slidably received upon the exterior of said drop tube above the first float in the recessed area of the housing;

said first hollow float sliding upward when fuel in the tank reaches a first predetermined level, said second hollow float sliding upward when fuel in the tank reaches a second predetermined level substantially above the first predetermined level;

a first valve door in said housing movable between a valve open position and a valve closed position, said first valve door having an aperture offset within the first valve door and said first valve door pivotally mounted in the drop tube wherein when said first valve door projects into said flow passage and is in the closed position downward flow passes only through the aperture;

a second valve door in said housing movable between a valve open position and a valve closed position, said second valve door pivotally mounted in the drop tube, said second valve door is cooperable with said first valve door whereby said second valve door obstructs the downward flow through the aperture when said second valve door is in the closed position; and whereby said first and second valve doors operate with the sliding movements of the first and second hollow floats.

3. The overfill valve assembly defined in claim 2 wherein said aperture is surrounded by at least one rib that prevents a complete seal of the aperture when the second valve door is in the closed position.

4. An overfill valve assembly for preventing overfilling of liquid storage tank via an inlet opening in the top of said tank and shutting off the flow of fluid;

said valve assembly comprising a valve housing essentially cylindrical, having at one side a recessed area;

a hollow drop tube sealingly secured to valve housing and extending vertically therethrough to the storage tank;

said drop tube having a first enlarged diameter section, a reduced diameter section, and a second enlarged diameter section, wherein the reduced diameter merges with the first enlarged diameter section at its upper end via an angular shoulder and merges with the second enlarged diameter section via a horizontal upwardly facing rim, said reduced diameter section corresponding to the recessed area of the housing;

a flow passage through the drop tube;

a lower hollow float slidably received upon the exterior of said drop tube in the recessed area of the housing;

an upper hollow float slidably received upon the exterior of said drop tube above the first float in the recessed area of the housing;

a main valve door in said housing movable between a valve open position and a valve closed position, said main valve door having an aperture offset within the main valve door and said aperture surrounded by at least one rib;

said main valve door pivotally mounted in a lower portion of the drop tube wherein when said main valve door projects into said flow passage and is in the closed position downward flow passes only through the aperture;

a secondary valve door in said housing movable between a valve open position and a valve closed position, said secondary valve door pivotally mounted in the lower portion of the drop tube and cooperable with said main valve door whereby said secondary valve door overlaps the rib and aperture to substantially obstruct the downward flow through the aperture when said secondary valve door is in the closed position;

a first actuating rod coupling said lower float to a first lever mechanism;

said first lever mechanism pivotally attached to a first pivotal hook for engagement with said first C-latch of the main valve door when the main valve door is in the open position;

a second actuating rod coupling said upper float to a second lever mechanism;

said second lever mechanism pivotally attached to a second pivotal hook for engagement with said second C-latch of the secondary valve door when the secondary valve door is in the open position; and whereby said main valve door is biased in the open position and closes with the upward movement of the lower float, and said secondary valve door is biased to be in the position of the main valve door and closes with the upward movement of the upper float.

5. The overfill valve assembly described in claim 4 wherein the first pivotal hook has a leg that impels the main valve door into the flow passage with the upper movement of the lower float, whereby the force of the downward flow closes the main valve door.

6. The overfill valve assembly described in claim 5 wherein said second actuating rod is slidably fixed at its lower end to said second lever mechanism and extends upwardly along the recessed area of the housing to pass freely through a bore in said upper and lower floats.

7. The overfill valve assembly described in claim 5 wherein the main valve door has a fin extending from an underside of the main valve door to provide surface area for the fuel flow to ensure movement of the main valve door to the closed position.

8. The overfill valve assembly described in claim 7 wherein a partial shield located in the down tube protects the fin and directs the downward flow of fuel.

9. The overfill valve assembly described in claim 4 wherein said first actuating rod is slidably fixed at its lower end to the first lever mechanism and extends upwardly along the recessed area of the housing to pass freely through a bore in said lower float.

10. The overfill valve assembly described in claim 4 wherein said main valve door when in its closed position is operable to reduce the flow of fluid in the flow passage to approximately 10–15% of the flow when said main valve door is in its open position.

11. The overfill valve assembly described in claim 4 wherein said main valve door and secondary valve door when in its closed position is operable to reduce the flow of fluid in the flow passage to approximately 1% of the flow when said main and secondary valve doors are both in their open position.

12. The overfill valve assembly described in claim 4 wherein a gasket encircles the upwardly facing rim providing a radial and lateral seal.

13. The overfill valve assembly described in claim 4 wherein first lever mechanism comprises a first lever having a slot wherein a lower end of the first actuating rod slidably travels in the slot; and the second lever mechanism comprises a second lever having a slot wherein a lower end of the second actuating rod slidably travels in the second slot.

14. A valve assembly for preventing overfilling of a liquid storage tank in series with piping for introducing liquid into the tank, comprising:

an elongated housing defining a liquid flow passageway extending longitudinally thereof, a liquid inlet communicating with said passageway adjacent one end thereof, a single liquid outlet communicating with said passageway adjacent the other end thereof;

float means for moving to predefined positions in response to a liquid level within said tank;

compound valve means having a main valve assembly and a secondary valve assembly, each valve assembly having an open position and a closed position, said main valve assembly significantly reducing flow of liquid from said passageway through said outlet when in said closed position, said secondary valve assembly blocking significant flow of liquid from said passageway through said outlet when in said closed position, wherein said compound valve means further comprises said main valve assembly and said secondary valve assembly having a common horizontal pivot axis; and valve control means, connected to said float means, for controlling operation of said compound valve means.

15. The valve assembly of claim 14 wherein said compound valve means further comprises said main valve assembly having an internally disposed secondary valve seat for receiving said secondary valve assembly, said secondary valve seat defining a restricted liquid flow aperture positionable in said liquid outlet.

16. The valve assembly of claim 14 wherein said main valve assembly significantly reduces liquid flow by at least 85% when in said closed position.

17. The valve assembly of claim 14 wherein said secondary valve assembly blocks significant liquid flow by at least 99% when in the closed position.

18. The valve assembly of claim 14 further comprising:

incomplete seal means between said main valve assembly and said secondary valve assembly for draining standing liquid above said compound valve means in said passageway to said tank.

19. The valve assembly of claim 14 wherein said float means further comprises:

an elongated float chamber extending longitudinally of said housing in laterally adjacent relationship to said passageway; and said float means disposed within said float chamber and being constrained thereby for movement along a substantially linear path of travel.

* * * * *